United States Patent [19]

Okamoto et al.

[11] Patent Number: 5,176,869
[45] Date of Patent: Jan. 5, 1993

[54] METHOD OF MANUFACTURING AN INNER LINED PIPE

[75] Inventors: Hiroshi Okamoto, Takatsuki; Takaaki Kawano, Osaka; Toshiyuki Tsujiuchi, Takatsuki; Hidenori Katayama, Suita, all of Japan

[73] Assignee: Nippon Shokubai Co., Ltd., Osaka, Japan

[21] Appl. No.: 746,639

[22] Filed: Aug. 19, 1991

Related U.S. Application Data

[63] Continuation of Ser. No. 503,901, Jan. 4, 1990, abandoned.

[30] Foreign Application Priority Data

Apr. 6, 1989 [JP] Japan .................. 1-85778
Dec. 28, 1989 [JP] Japan ................ 1-344391
Dec. 28, 1989 [JP] Japan ................ 1-344394

[51] Int. Cl.⁵ ............... B29C 39/10; B29D 23/22
[52] U.S. Cl. ..................... 264/270; 118/318; 118/DIG. 10; 138/146; 264/36; 264/311; 427/231; 427/240
[58] Field of Search .............. 264/36, 269, 34, 270, 264/310, 311; 138/141, 145, 146, DIG. 1, DIG. 7; 428/36.9, 36.91; 427/231, 233, 240, 241; 118/318, 320, DIG. 10

[56] References Cited

U.S. PATENT DOCUMENTS

| 3,950,465 | 4/1976 | Farahar | 264/269 |
| 4,001,370 | 1/1977 | Baker et al. | 264/270 |
| 4,133,938 | 1/1979 | Bingham | 156/329 |
| 4,142,555 | 3/1979 | Satake et al. | 138/DIG. 7 |
| 4,169,906 | 10/1979 | Hallstrom et al. | 138/145 |
| 4,491,650 | 1/1985 | Rizk et al. | 525/102 |
| 4,515,832 | 5/1985 | Roeder et al. | 427/233 |
| 4,602,591 | 7/1986 | Matsuda | 118/DIG. 10 |

FOREIGN PATENT DOCUMENTS 50-76174 6/1975 Japan .
60-90713 5/1985 Japan .

Primary Examiner—Jeffery Thurlow
Assistant Examiner—Mathieu Vargot
Attorney, Agent, or Firm—Oblon, Spivak, McClelland, Maier & Neustadt

[57] ABSTRACT

A method of manufacturing an inner lined pipe in which a lining layer is formed to the inner circumferential surface of a pipe using a centrifugal molding method, wherein a resin mortar material and a hardening agent for lining are mixed at the top end of an arm member of a supply device and discharged, thereby enabling to select a lining material of a short pot life to attain efficient production, as well as eliminate wasteful consumption of the lining material.

2 Claims, 4 Drawing Sheets

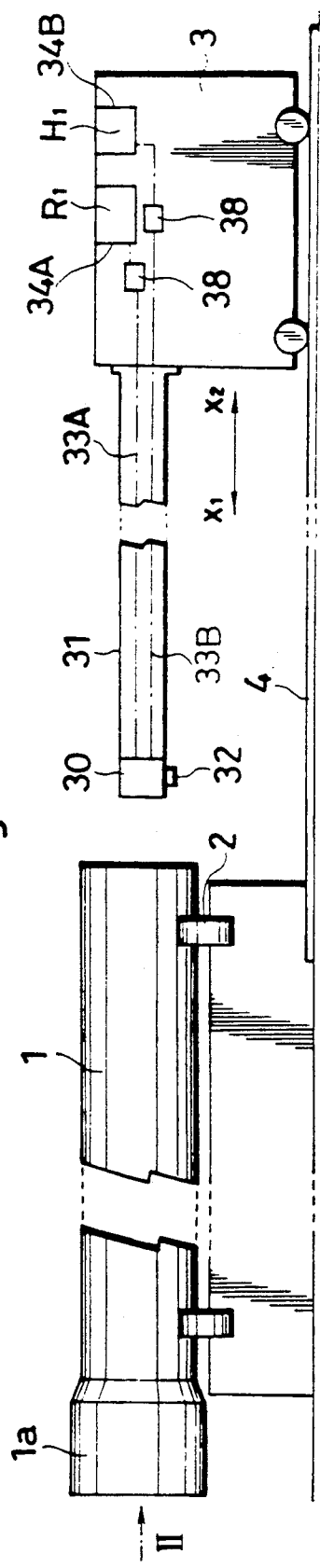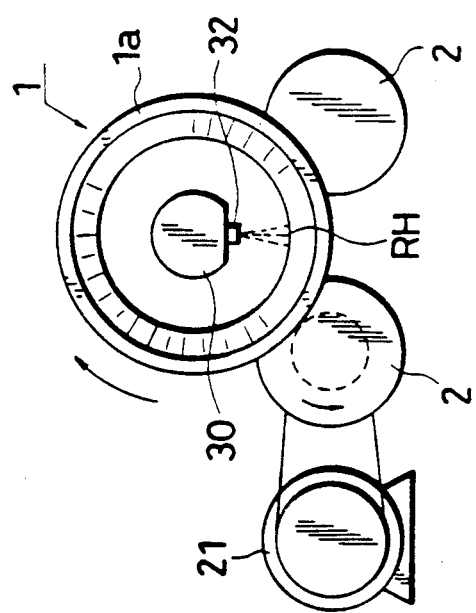

METHOD OF MANUFACTURING AN INNER LINED PIPE

This is a continuation of application Ser. No. 07/503,901 filed on Apr. 4, 1990 now abandoned.

BACKGROUND OF THE ART

Concrete pipes, earthern pipes, iron pipes, etc. have been used as service or sewage water pipes, drain pipes or agricultural water pipes. However, these pipes involve a drawback of easily suffering from corrosion in contact with acids, salts or oils and fats. In view of the above, lining layers comprising synthetic resins such as unsaturated polyester resin, vinyl ester resin, urethane modified (metha)acrylate resin, etc. as a binder in admixture with inorganic aggregates are formed to the inner surface of pipes and used as inner lined pipes (inner lined pipes as described in, for example, Japanese Patent Laid Open Sho 60-90713).

As a method of manufacturing inner lined pipe, there has been known a centrifugal molding method as shown in Japanese Patent Laid Open Sho 50-76174.

FIG. 8 is a schematic explanatory view of an apparatus used for such a method in which a pipe 1 to be lined is placed on rotating rollers 2 . . . and the rotating roller 2 is driven by a driving device (not illustrated) to exert a centrifugal force of greater than several tens of g (by gravitational unit) to the inner circumferential surface of the pipe 1. Lining material scattered from a lining material discharge nozzle 32 to the inner circumferential surface of the pipe is smoothed by the centrifugal force upon reaching the inner circumferential surface of the pipe. The device for supplying the lining material comprises rails 4 laid in parallel with the longitudinal direction for the axis of the pipe 1, a carrier 3 placed movably horizontally thereover and an arm member 31 is attached to the carrier 3 on the side of the pipe 1, retractably in the longitudinal direction of the pipe axis at the inside of the pipe 1, and the lining material discharge nozzle 32 is disposed at the top end of the arm member 31. The discharge nozzle 32 is connected by way of a lining material supply pipe 33 to a hopper 34 on the carrier 3, and a resin mortar $R_1$ (mixture of resin material and inorganic aggregate) and a hardening agent $H_1$ previously mixed are stored in the hopper 34. The stored lining material is supplied by means of air pressure, etc. of a compressor 35 by way of the supply pipe 33 to the discharge nozzle 32. The lining material is sprayed from the discharge nozzle 32 to the inner circumferential surface of the pipe 1 and smoothed by the rotational centrifugal force of the pipe 1 to form a hardened lining layer. Accordingly, by gradually advancing the arm member 31 deeply to the inside of the pipe 1, the lining layer is formed to the circumferential surface over the entire length thereof.

By the way, since the resin mortar as the lining material is previously mixed with the hardening agent before discharge from the discharge nozzle 32, the lining material should have a long pot life. If the selection of the material is not proper, the material hardens in the supply pipe 33 or the discharge nozzle 32 to result in clogging troubles. Further, if clogging does not occur, since the lining material which starts hardening and gradually loses flexibility is supplied to the inner circumferential surface of the pipe 1, it is necessary to considerably increase the centrifugal force or use an additionally physical smoothing means (for example, spatula, etc.) in order to smooth the material. This inevitably lowers the production efficiency and the material once mixed with the hardening agent has to be spent completely soon, which may lead to wasteful consumption of the lining material.

On the other hand, although the lining material is spread and coated to the inner circumferential surface of the pipe by the centrifugal force of the pipe, the lining material is not firmly adhered to the inner circumferential surface of the pipe 1, depending on the material and the smoothness at the inner circumferential surface of the pipe and, accordingly, the inner lined layer may sometime be peeled off readily by internal stresses caused by the difference in heat shrinkage or external load applied from the outside because of the insufficiency in the adhesion.

As a means for overcoming such problems, Japanese Patent Laid Open Sho 58-78618 discloses a technique of disposing a grinding means at the top end of the arm member 31 for roughening the circumferential surface of the pipe. However, the technique makes the apparatus complicate and, nevertheless, can not completely overcome the foregoing problem and, in addition, results in an additional problem of lowering the production efficiency due to the increase in the production steps.

SUMMARY OF THE INVENTION

It is, accordingly, a first object of the present invention to provide a method of manufacturing an inner lined pipe not suffering from disadvantage even when a resin mortar having a short pot life is used as the lining material and capable of effectively forming the lining layer by the rapid hardening of the lining material in the manufacturing step.

The second object of the present invention is to provide an apparatus capable of using a mixture of lining material and a hardening agent with no wasteful loss and avoiding hardening of the lining material at the inside of the supply pipe even when the production is interrupted and, accordingly, capable of easily conducting cleaning operation, etc. to the supply device.

The third object of the present invention is to provide a method of manufacturing an inner lined pipe capable of forming firm adhesion between the inner surface of the pipe and the lining layer, which is not peeled readily due to the difference in the heat shrinkage or external force.

BRIEF DESCRIPTION OF THE DRAWINGS

FIG. 1 is an explanatory side elevational view illustrating one embodiment of an apparatus used for the present invention;

FIG. 2 is an explanatory view taken along the direction of arrows in FIG. 1;

DETAILED DESCRIPTION OF THE PREFERRED EMBODIMENT

Figure 3:
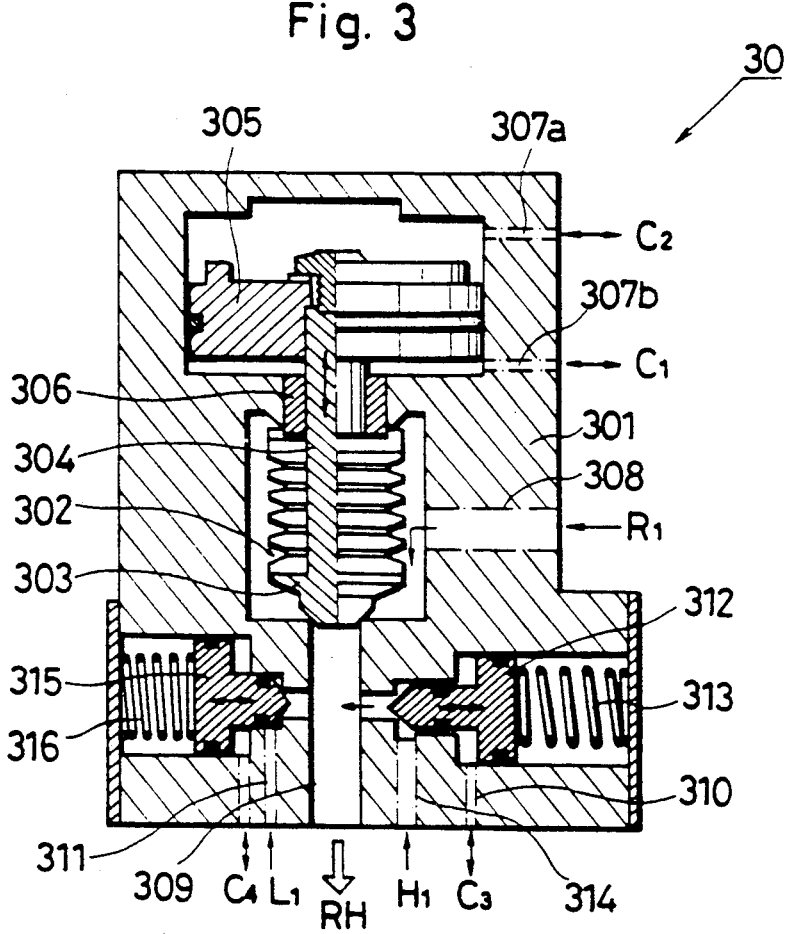
FIG. 3 is a cross sectional view illustrating a structure of a mixing section 30 in the apparatus shown in FIG. 1.

FIG. 1 is a schematic explanatory view illustrating one embodiment of an apparatus for supplying lining material utilized in the method according to the present invention. A pipe 1 is placed horizontally on two pairs of rotational rollers 2 . . . as shown in FIG. 2 and the pipe 1 is rotated in a not-restricted manner by the rotation of rotational rollers 2, 2 . . . connected to a driving motor 21. Further, a carrier 3 moves on a rail 4 in the direction of arrows $x_1$ $x_2$, so that the arm member 31 is reciprocatable in a hollow portion of the pipe 1. A specific constitution for practicing the present invention is that a mixing section 30 is disposed at the top end of the arm member 31 and a lining material discharge nozzle 32 is connected to the mixing section 30 for discharging the lining material comprising the resin mortar in admixture with the hardening agent toward the pipe 1. A resin material supply pipe 33A and a hardening agent supply pipe 33B are connected respectively to the mixing section 30 and the supply pipes 33A and 33B are connected respectively by way of supply pump mechanisms 38, 38 to a resin material storing vessel 34A and a hardening material storing vessel 34B respectively.

FIG. 3 is an explanatory cross sectional view illustrating one embodiment of the mixing section 30 described above. The resin material supply pipe 33A is connected to a resin channel 308, which is connected with a storing section 302 and connected by way of an ON-OFF valve 303 to a mixing channel 309. On the other hand, the hardening agent supply pipe 33B is connected to a hardening agent channel 314, which is connected by way of an ON-OFF valve 312 to the mixing channel 309. In the illustrated embodiment, a cleaning channel 311 and an ON-OFF valve 315 are additionally disposed, such that the mixing channel 309, etc. can be cleaned with a solvent $L_1$ such as acetone after the completion of the discharging operation of the lining material (lower left portion in FIG. 3). It is preferred to use abrasion resistant material, for example, tungsten carbide or ceramic coating layer for the portion of the mixing section 30 and the supply pipe 33A in which the resin mortar is passed and to use a reciprocating pump made of highly abrasion resistant material as a pump for supply the resin mortar.

The resin mortar material $R_1$ and the hardening agent $H_1$ are mixed in the mixing section 30 as described below. That is, the ON-OFF valve 302 is opened by the pressure of a controlling fluid $C_1$ to introduce the resin mortar material $R_1$ into the mixing channel 309, while the ON-OFF valve 312 is opened by a controlling fluid $C_3$ to introduce the hardening agent $H_1$ by way of the mixing channel 309 to the mixing channel 309, where the resin mortar material $R_1$ and the hardening agent $H_1$ are mixed and then sent to a lining material discharge nozzle 32 in communication with the mixing channel 309.

Figure 4:
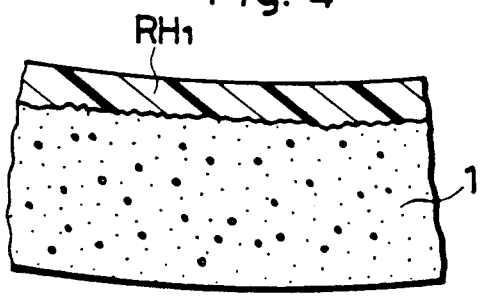
FIG. 4 is a explanatory cross sectional view illustrating an inner lined pipe.

Accordingly, the resin mortar material $R_1$ and the hardening agent $H_1$ separately supplied from the storage vessels 34A and 34B are mixed in the mixing section 30 disposed at the top end of the arm member 31 and the lining material $R_1$ is discharged from the discharge nozzle 32 disposed just below in the form of a liquid droplet or liquid stream to the inner circumferential surface of the pipe 1 as shown in FIG. 2. Then, the arm member 31 is forwarded in the longitudinal direction of the pipe axis for the tube 1 and a lining layer $RH_1$ as shown in FIG. 4 is formed entirely over the pipe 1. The arm member 31 may be adapted such that the formation of the lining layer is completed by a single or reciprocating stroke of the arm member 31 in the direction of the pipe axis or such that the lining layer is formed as a laminate by repeating strokes for several times. Further, the shape of the pipe 1 is not restricted only to the embodiment formed with a receptacle 1a of enlarged diameter shown in the drawing but it is applicable also to concrete pipes earthern pipes, iron pipes, etc. having linear shape or reduced diameter portion. Further, the resin mortar material $R_1$ usable herein may be mixed with mortar aggregates or mixed with glass flakes, reinforcing fibers, etc. Depending on the application use, material mixed with hardening promotor or a wetting agent may be used and, further, a liquid hardening agent compatible with the kind of the resin is used as the hardening agent. As one example of the composition for the lining material, the following can be exemplified.

| (Resin Mortar Material) | |
|---|---|
| Unsaturated polyester resin: | 100 parts by weight. |
| Hardening promoter (cobalt naphthenate): | 0.5 parts by weight |
| Silica sand stone powder with an average grain size of less than 50 um: | 200 parts by weight |
| (Hardening Agent) | |
| Methyl ethyl ketone peroxide: | 1.0 parts by weight |

Since the material has been formulated as described above, a short hardening time for the lining material can be set to enable effective production of an inner lined pipe and, since a relatively soft material just after mixing the hardening agent can be discharged to the pipe 1, a smooth lined pipe can be formed without requiring large rotational centrifugal force. Further, since there is no requirement to store a great amount of lining material mixed with the hardening agent, wasteful consumption of the lining material can be eliminated completely.

Further, since the lining material is discharged in the form of liquid droplet or liquid stream, scattering of the lining material can be prevented to avoid circumferential pollution or wasteful scattering of the resin material.

Further, it has been found effective to previously coat the inner surface of the pipe with a primer material for improving the adhesion between the lining layer $RH_1$ and the inner surface of the pipe 1. In the specification, the material before mixing with the hardening agent is merely referred to as a primer and the material coated to the pipe is referred to as a primer material.

Figure 6:
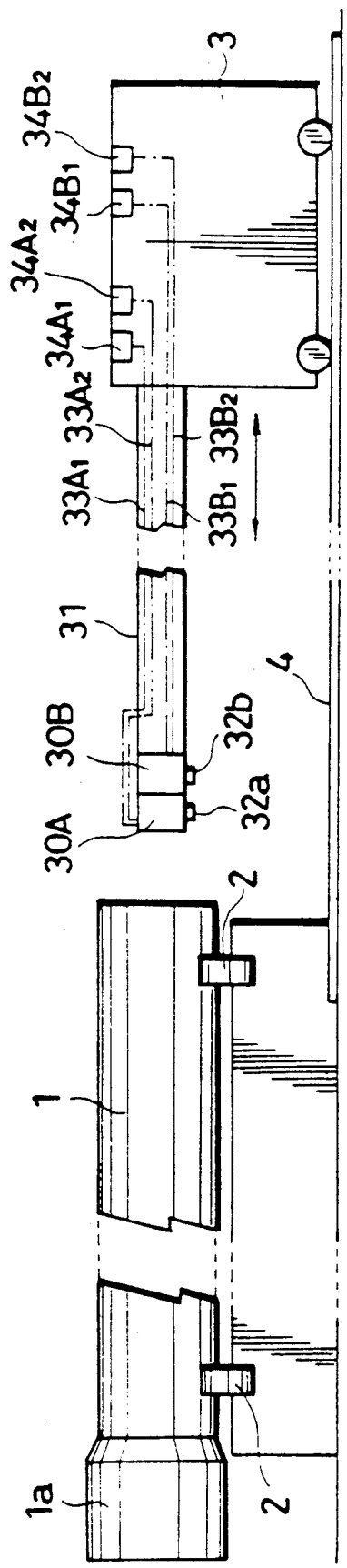
FIG. 6 is an explanatory side elevational view illustrating one embodiment of an apparatus used in another method according to the present invention.

FIG. 6 is a schematic explanatory view illustrating a supply device of the lining material and a rotational device combined with a coating mechanism for the primer material. The rotational device for the pipe 1, the carrier 3, etc. have the same structures as those shown in FIG. 1. A primer material mixing section 30A and a lining material mixing section 30B are disposed side by side at the top end of the arm member 31, and the primer material mixing section 30A is connected with a primer supply device $34A_1$ and a hardening agent supply device $34A_2$ by way of supply pipes $33A_1$ and $33A_2$ respectively. Further, the lining material mixing section 30B is connected with a lining resin supply device 34B$_1$ and a hardening agent supply device 34B$_2$ by way of supply pipes 34B$_1$ and 34B$_2$ respectively in the same manner as in the foregoing embodiment.

As the mixing sections 30A, 30B, a structure, for example, as shown in FIG. 3 (in cross sectional view) is used.

Figure 5:
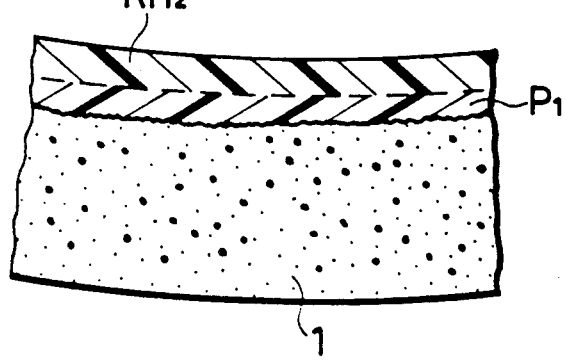
FIG. 5 is an explanatory cross sectional view for a pipe formed with a lining layer after coating a primer material according to the present invention.

The method of manufacturing the inner lined pipe using the apparatus described above is shown below. At first, when the arm member 31 is inserted and advanced deeply into the inside of the pipe 1, the primer and the hardening agent are mixed in the primer material mixing section 30A and the primer material is discharged to the inner circumferential surface of the pipe 1 to form a primer layer P$_1$ (refer to FIG. 5). In this case, the centrifugal force at the inner circumferential surface of the pipe is preferably set to 5-50 g, and it is recommended that the primer material is discharged from the discharge nozzle 32a in the form of a liquid droplet at a discharging amount of 100 to 800 g/min for preventing the scattering of the material. After discharging the primer material as far as the end of the pipe 1, the moving direction of the arm member 31 is turned to the direction of retracting from the pipe 1. Then, the arm member 31 is withdrawn as far as the pipe end while mixing the resin mortar material and the hardening agent in the mixing section in the 30B and discharging the lining material RH from the lining discharge nozzle 32b. In this case, the centrifugal force at the inner circumferential surface of the pipe 1 is preferably set to 5-50 g and the lining material is desirably discharged in the form of a continuous liquid stream so that the material is extended smoothly over the inner circumference of the pipe. Thus, the primer material layer P$_1$ and the lining layer RH$_2$ are successively laminated on the surface of the pipe 1 as shown in FIG. 5.

When the primer material layer P$_1$ is formed as described above, the primer material penetrates as far as the fine gaps at the inner surface of the pipe 1 and hardens to provide an anchoring effect. Further, when the primer material P$_1$ and the lining material RH$_2$ fusible to each other are used, they can be adhered firmly and, as a result, can provide the following advantageous effects. That is, since the adhesion between the pipe 1 and the lining layer RH$_2$ can be improved outstandingly as compared with the usual case:

(1) troubles of peeling in the lining layer due to perforation or cutting during piping work can be overcome, (2) troubles of corrosion due to sewage water after piping work is eliminated and, moreover, trouble such as so-called "blister" or "raising" in the lining layer due to vapor phenomenon caused by pressurizing water can also be overcome.

In addition, since the primer material partially penetrates into and hardens at the inside of gaps of the concrete pipe, (3) corrosion resistance of the pipe itself can be improved to make the lining layer thinner, and (4) the strength of the pipe itself is improved to make the thickness of the entire pipe thinner.

Figure 7:
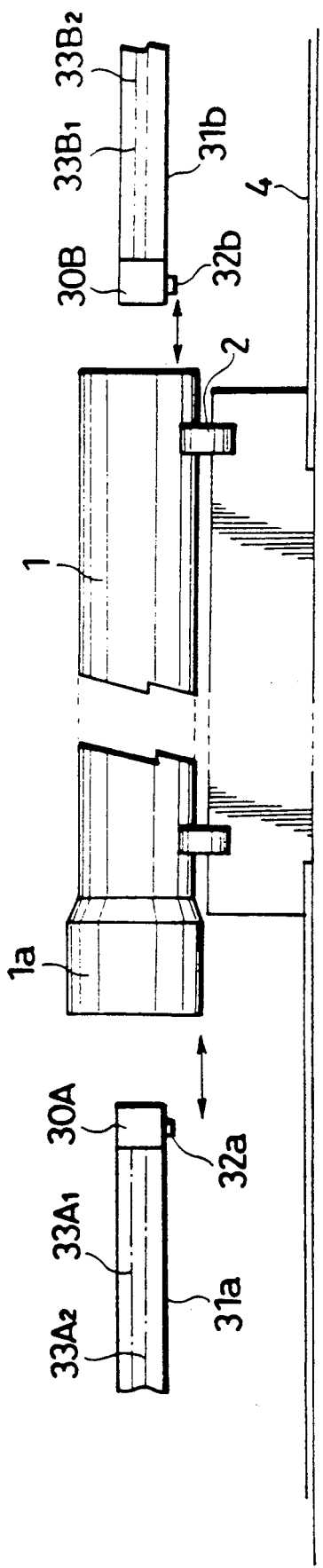
FIG. 7 is an explanatory side elevational view illustrating one embodiment of an apparatus used for another method according to the present invention.
Figure 8:
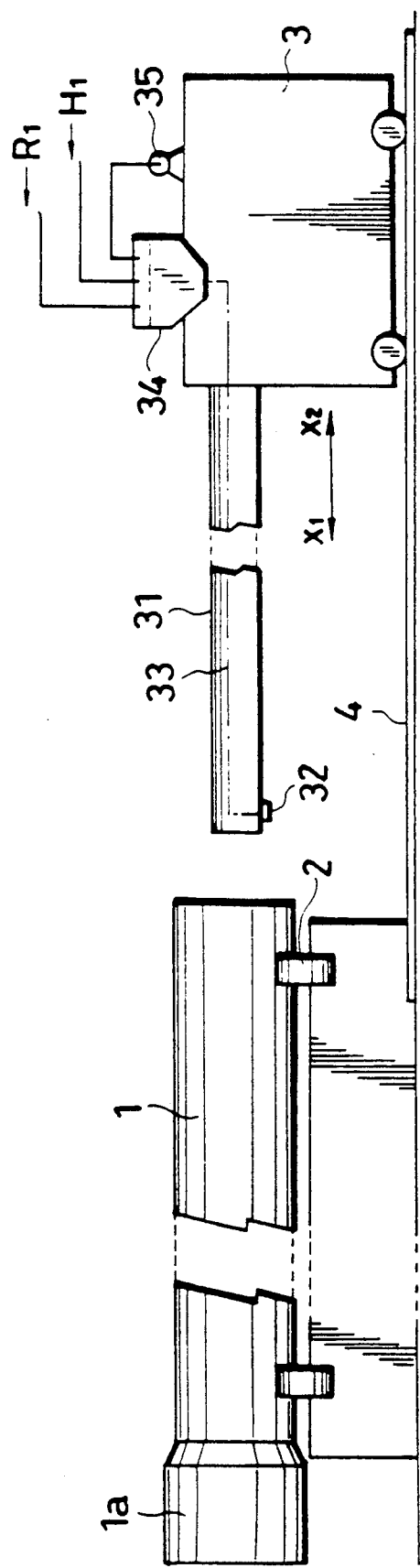
FIG. 8 is an explanatory side elevational view illustrating one embodiment of an apparatus used for the conventional method.

The method of forming the primer material layer P$_1$ is not restricted only to that in the above-mentioned embodiment, but two arm members 31a, 31b may be used as shown in FIG. 7 for supplying and forming the primer material and the lining material by separate devices. For instance, it is possible to employ a method of mixing the primer and a hardening agent in the primer mixing section 30A and discharging the primer material from the primer material discharge nozzle 32a to the inner surface of the pipe, and then discharging the lining material mixed in the mixing section 30B by an arm member 31b disposed on the side of the opposite face from the lining material discharging nozzle 32b. The arm members 31a, 31b may be disposed in parallel with each other and advanced or retracted in the identical direction.

In a case of using a radical polymerization type thermosetting resin as the binder for the lining material, it is preferred to use, for example, a radical polymerizable monomer containing at least 30% by weight of a monofunctional and/or polyfunctional (metha)acrylate with a molecular weight of less than 1,000 as a primer and radical polymerization initiator as a hardening agent. The primer develops a remarkable effect as the primer material for the lined pipe due to the anaerobic hardening property of (metha)acrylate contained. That is, since the previously coated primer material partially penetrates into and hardens in the gap at the inner surface of the pipe, it firmly adheres with the pipe layer to apply reinforcement.

On the other hand, the primer material partially remains not-hardened at the surface of the pipe not being concerned with elapse of time after coating the primer material and integrally hardens with the lining layer directly after the lamination of a thermosetting resin material as the lining layer. In this way, the primer material can provide strong adhesion to the pipe.

In the present invention, as the radical polymerization type thermosetting resin for forming the lining layer RH$_2$, there can be used those resins capable of thermosetting under radical polymerization and used for the lining of concrete hume pipes, for example, polyester resin, vinyl ester resin, acrylic resin, urethane (metha)acrylate resin, etc. as the resin mortar.

Further, as the mono-functional (metha)acrylate and/or poly-functional (metha)acrylate having a molecular weight of less than 1,000 contained in the radical polymerizable monomer constituting the primer (hereinafter simply referred to as (metha)acrylate), any of materials may be used so long as the material contain one or more of (metha)acryloyl groups in the molecule and having a molecular weight of less than 1,000. For instance, there can be mentioned mono-functional (metha)acrylates such as methyl (metha)acrylate, ethyl (metha)acrylate, isopropyl (metha)acrylate, isobutyl (metha)acrylate, n-butyl (metha)acrylate, 2-ethylhexyl (metha)acrylate, hydroxyethyl (metha)acrylate, methoxyethyl (metha)acrylate, paramethyl phenoxyethyl (metha)acrylate, dicyclopentadienyl (metha)acrylate, dicyclopentenyloxyethyl (metha)acrylate, (metha)acryloxyethylphosphate, 2-hydroxy-3-phenyloxypropyl (metha)acrylate; polyfunctional (metha)acrylates such as ethylene glycol di(metha)acrylate, propylene glycol di(metha)acrylate, neopentyl glycol di(metha)acrylate, glycerin tri(metha)acrylate, trimethylolpropane tri(metha)acrylate, dipentaerythritol hexa(metha)acrylate, bisphenol A di(metha)acrylate, butanediol (metha)acrylate, hexane diol (metha)acrylate, polyethyleneglycol (metha)acrylate, polypropyleneglycol (metha)acrylate.

As the primer, the mono-functional (metha)acrylates and poly-functional (metha)acrylates may be blended alone or as a mixture of two or more of them, or as a mixture with a radical polymerizable monomer other than the (metha)acrylate as described above, for example, styrene, halogenated styrene, methylstyrene, vinyltoluene, divinylbenzene, vinylacetate and diarylphthalate. It is desirable that the radical polymerizable monomer constituting the primer contains more than 30% by weight of the (metha)acrylates. If the content of the (metha)acrylates is less than 30% by weight of, no sufficient effect can be obtained for the improvement of the adhesion between the pipe layer and the lining layer.

Further, the molecular weight of (metha)acrylates blended with the primer for use is not more than 1,000, preferably, not more than 500. (Metha)acrylates with the molecular weight in excess of 1,000 are insufficient with respect to permeation into the gaps at the inner surface of the pipe, failing to obtain a sufficient adhesion between the pipe layer and the lining layer.

As the hardening agent constituting the primer material, a radical polymerization initiator is used and those known compounds forming radicals at a temperature higher than the decomposing temperature to bring about radical polymerization are used. For example, there can be mentioned organic peroxides such as benzoyl peroxide, methyl ethyl ketone perxide, cumene hydroperoxide, cyclohexane peroxide and lauroyl peroxide, or azo compound such as azobisisobutylonitrile. If required, it may be used in combination with a polymerization promoter such as an organic metal salt (for example, cobalt naphthenate or cobalt octenate), aliphatic amine, aromatic amines and mercaptans.

The primer used in the present invention is prepared by blending a radical polymerization initiator with the radical polymerizable monomer containing the specific (metha)acrylates described above, and the blending amount of the radical polymerization initiator can properly be increased or decreased depending on the hardening property required for the primer. However, it is preferred to adjust the hardening property of the primer material in order to attain the reinforcement for the pipe and the improvement for the adhesion of the corrosion proof lining layer in a well balanced manner and it is desirable to blend the radical polymerization initiator at a ratio of 0.1 to 5 parts by weight, preferably, from 0.5 to 3 parts by weight based on 100 parts by weight of the radical polymerizable monomer.

Further, the primer material may be blended as required with a diluent of an organic solvent for improving operationability of the coating in such a range as not hindering the permeation into the gaps at the surface of the pipe or anaerobic, property of the primer material, and an adhesion enhancing additives such as a silane coupling agent for further improving the adhesion.

Coating means for the primer material as described above is not restricted only to the embodiment shown in FIGS. 6 and 7 but known means such as brush or roller may also be used so long as the lining layer $RH_1$ can be formed to the inner surface of the pipe coated with the primer material by the method as shown in FIG. 1 described above.

(EXAMPLE 1)

A concrete hume pipe of 250 mm diameter after primary culture was rotated with the axial center being set horizontal, and 100 parts by weight of 2-hydroxyethyl methacrylate (molecular weight: 130) as a primer, 1.0 parts by weight of benzoyl peroxide as a radical polymerization initiator i.e., a hardening agent and 0.5 parts by weight of dimethyl aniline were blended and uniformly coatedat a rate of 200 g/m² as the primer material to the inner circumferential surface of the hume pipe.

Then, a mixture of 100 parts by weight of an unsaturated polyester resin (EPOLAC G-103, manufactured by Nihon Shokubai Kagaku Kogyo Co.), 100 parts by weight of a powdery silica stone and 100 parts by weight of silica sand No. 7 was used as a lining resin mortar, to which one part by weight of benzoyl peroxide and 0.5 part by weight of dimethyl aniline as the hardening agent were mixed and then the lining material was discharged to the inner surface of the hume pipe rotated by the device as shown in FIG. 6 to form a corrosion-proof lining layer of 2 mm thickness, it was cultured and hardened at 80° C. for one hour to obtain an inner lined hume pipe (1).

The thus manufactured inner lined hume pipe (1) was formed with a hole of 50 mm diameter from the side of the pipe member by a puncturing drill, and the state of crack in the corrosion-proof lining layer at the perforated portion was observed and evaluation was made for the adhesion between the cement concrete layer of the hume pipe and the corrosion-proof lining layer.

The results are as shown in Table 1.

(EXAMPLES 2-10)

The same procedures as those in Example 1 were applied except for using radical polymerizable monomers of blending compositions as shown in Table 1 instead of the radical polymerizable monomer, i.e., 2-hydroxyethyl methacrylate (100 parts by weight) in the primer of Example 1, to obtain inner lined hume pipes (2)-(10).

Adhesion was evaluated for the thus manufactured inner lined hume pipes (2)-(10) respectively in the same manner as in Example 1 and the results are shown in Table 1. Comparative Example 11-14

The same procedures as those in Example 1 were applied except for using radical polymerizable monomers of the blending compositions shown in Table 1, to obtain inner lined hume pipes (11)-(14).

Adhesion was evaluated for the respective comparative inner lined hume pipes (11)-(14) thus manufactured in the same manner as in Example 1 and the results are shown in Table 1.

Table 1 (1)

1 . . . Example,
2 . . . Kind of inner lined hume pipe obtained,
3 . . . Inner lined concrete hume pipe,
4 . . . Blend composition of radical polymerizable monomer in the primer used for manufacturing inner lined hume pipe (parts by weight),
5 . . . Result of evaluation for adhesion of inner lined hume pipe,
6 . . . 2-hydroxyethyl methacrylate (molecular weight: 130)
7 . . . 2-hydroxyethyl methacrylate, styrene,
8 . . . 2-hydroxyethylene methacrylate, styrene,
9 . . . diethylene glycol dimethacrylate (molecular weight: 242),
10 . . . diethyleneglycol dimethacrylate, styrene,
11 . . . trimethylol propane trimethacrylate (molecular weight 338),
12 . . . trimethylol propane trimethacrylate styrene,
13 . . . Neither peeling in the corrosion-proof lining layer, nor "chipping" in the hume pipe main body at the periphery of perforation.

Table 1 (2)

1 . . . Example,

1'... Comparative Example.
2... Kind of inner lined hume pipe obtained.
3... Inner lined concrete hume pipe.
3'... Inner-lined hume pipe.
4... Blend composition of radical polymerizable monomer in the primer used for manufacturing inner lined hume pipe (parts by weight).
5... Result of evaluation for adhesion of inner lined hume pipe.
7... 2-hydroxyethyl methacrylate, styrene.
12... trimethylolpropane trimethacrylate styrene.
13... Polyethylene glycol diacrylate (average molecular weight: 1134), styrene.
15... styrene.
16... Peeling in the corrosion-proof lining layer was observed over considerable area from the periphery of the perforation.
17... Peeling in the corrosion-proof lining layer was observed at the periphery of the perforation and "chipping" observed to the hume pipe main body at the periphery of perforation.

Comparative Example 15

The same procedures as those in Example 1 were applied except for using an identical amount of an urethane resin (KBK-YP, manufactured by Kanebo NNC Co.) instead of the primer material in Example 1, to obtain an inner lined hume pipe (15).

When adhesion was evaluated for the thus manufactured inner lined hume pipe (15) in the same manner as in Example 1, peeling was observed for the corrosion-proof lining layer at the periphery of the punctured portion.

(Comparative Example 16)

The same procedures as those in Example 1 were applied except for using an identical amount of an epoxy resin (HYPON 20 ACE, manufactured by Nihon Paint Co.) instead of the primer material in Example 1, to obtain an inner lined hume pipe (16).

When adhesion was evaluated for the thus manufactured inner lined hume pipe (16) in the same manner as in Example 1, peeling was observed for the corrosion-proof lining layer over a considerable area from the periphery of the perforated portion.

(Comparative Example 17)

Without coating the primer material in Example 1 to the inner circumferential surface of a hume pipe, a resin mortar material obtained by using a low shrinkage type unsaturated polyester resin (EPOLAC N-134, manufactured by Nihon Shokubai Kagaku Kogyo Co.) instead of the lining resin (unsaturated polyester resin) in Example 1 was discharged to the inner surface of the hume pipe and, to obtain an inner lined hume pipe (17) in the same procedures as those in Example 1.

When adhesion was evaluated for the thus manufactured inner lined hume pipe (17) in the same manner as in Example 1, peeling was observed for the corrosion-proof lining layer over a considerable area from the periphery of the perforated portion, and many (chipping) was observed in the hume pipe main body at the periphery of the perforated portion.

What is claimed is:

1. A method of manufacturing an inner lined concrete pipe by inserting an arm member of a lining material supply device into the concrete pipe rotating around a pipe axis at its center, retracting said member in the longitudinal direction of the pipe axis and discharging a lining material from a discharge nozzle disposed at the top end of said arm member, wherein the process comprises:

coating a primer material to the inner surface of the pipe to provide a coating of primer material, wherein said primer material is a two component system comprising a primer and a hardening agent, sending said primer and said hardening agent by way of separate sending routes and then mixing in a primer material mixing section disposed at the top end of an arm member of a primer material supply device adapted to move forward and backward in the longitudinal direction along the pipe axis in the pipe rotating around the pipe axis at the center and discharging said mixed primer material from a primer material discharge nozzle connected to said primer material mixing section to the inner circumferential surface of the pipe; and sending an unsaturated polyester resin mortar for lining and a hardening agent by way of separate sending routes to a lining material mixing section disposed at the top end of such arm member, mixing said resin mortar and said hardening agent in said lining material mixing section and discharging the thus mixed lining material from a lining material discharge nozzle connected to said lining material mixing section and forming a lining layer over said coating of primer material;

wherein a radical polymerizable monomer consisting essentially of at least 30% by weight of a monofunctional and/or polyfunctional (metha)acrylate with a molecular weight of not greater than 1,000 is used as the primer and a radical polymerization initiator is used as the primer material hardening agent.

2. A method of manufacturing an inner lined concrete pipe as defined in claim 1, wherein the primer material mixing section and the lining material mixing section are disposed side by side at the top end of one arm member, said arm member is moved forward and backward in the longitudinal direction of the pipe axis in the rotating pipe, the primer material is discharged by way of the primer material mixing section, and the lining material is then discharged over said coating of primer material by way of the lining material mixing section.

* * * * *

UNITED STATES PATENT AND TRADEMARK OFFICE
CERTIFICATE OF CORRECTION

PATENT NO. : 5,176,869

DATED : January 5, 1993

INVENTOR(S) : Hiroshi Okamoto et al.

It is certified that error appears in the above-identified patent and that said Letters Patent is hereby corrected as shown below:

On the title page, Item [63],

The Related U.S. Application Data is incorrect, should be,

--Continuation of Ser. No. 503,901, April 4, 1990, abandoned--

Signed and Sealed this

Second Day of November, 1993

Attest:

BRUCE LEHMAN

Attesting Officer    Commissioner of Patents and Trademarks